United States Patent [19]

Yamada et al.

[11] Patent Number: 4,975,339
[45] Date of Patent: * Dec. 4, 1990

[54] MAGNETO-OPTICAL RECORDING MEDIUM WITH AT LEAST ONE PROTECTIVE LAYER CONTAINING PLATINUM AND/OR PALLADIUM

[75] Inventors: Takashi Yamada; Masaaki Nomura; Ryoichi Yamamoto; Akira Nahara, all of Odawara, Japan

[73] Assignee: Fuji Photo Film Co., Ltd., Minamiashigara, Japan

[*] Notice: The portion of the term of this patent subsequent to Dec. 6, 2005 has been disclaimed.

[21] Appl. No.: 245,161

[22] Filed: Sep. 16, 1988

Related U.S. Application Data

[62] Division of Ser. No. 37,884, Apr. 13, 1987, Pat. No. 4,789,606.

[30] Foreign Application Priority Data

Apr. 17, 1986 [JP] Japan .................................. 61-88764
Apr. 24, 1986 [JP] Japan .................................. 61-95180

[51] Int. Cl.$^5$ ............................................. G11B 11/00
[52] U.S. Cl. ...................................... 428/694; 428/900
[58] Field of Search ...................... 428/694, 900, 693; 430/945; 360/131; 365/122; 369/13, 288

[56] References Cited

U.S. PATENT DOCUMENTS 4,816,841  3/1989  Kobayashi et al. ................ 430/945

*Primary Examiner*—George F. Lesmes
*Assistant Examiner*—Dennis V. Carmen
*Attorney, Agent, or Firm*—Sixbey, Friedman, Leedom & Ferguson

[57] ABSTRACT

A magneto-optical recording medium comprises a transparent substrate, a magneto-optical recording layer formed on the transparent substrate and containing a rare earth metal-transition metal alloy, and a thin film containing at least either one of platinum and palladium and formed at least on one surface of the magneto-optical recording layer. Or, the magneto-optical recording medium comprises the transparent substrate, and a magneto-optical recording layer formed on the transparent substrate by alternately overlaying a plurality of thin layers containing a rare earth metal-transition metal alloy, and a plurality of thin layers containing at least either one of platinum and palladium.

5 Claims, 1 Drawing Sheet

MAGNETO-OPTICAL RECORDING MEDIUM WITH AT LEAST ONE PROTECTIVE LAYER CONTAINING PLATINUM AND/OR PALLADIUM

This is a Divisional application of Ser. No. 037,884, filed April 13, 1987, now U.S. Pat. No. 4,789,606.

BACKGROUND OF THE INVENTION

1. Field of the Invention

This invention relates to a magneto-optical recording medium such as a magneto-optical disk which is used for a large-capacity information file or the like. This invention particularly relates to an improvement of a magneto-optical recording layer of the magneto-optical recording medium.

2. Description of the Prior Art

Among optical recording media having various advantages, for example, the advantages that they can record information at a high density, have a large capacity, and need not be contacted with a read/write head, magneto-optical recording media have attracted attention from the viewpoint of easy erasing and rerecording.

The magneto-optical recording medium is composed of a magnetic material as a recording medium, and records information based on changes in magnetization of the magnetic material. For example, an amorphous alloy composed of a combination of a rare earth metal (RE) such as Gd, Tb or Dy with a transition metal such as Fe, Co or Ni is used as the magnetic material. The magnetic material is used in a layer form as a recording layer.

The rare earth metal used as the magnetic material is readily oxidized and corroded. When the magnetic material is oxidized or corroded, magnetic characteristics such as coercive force thereof deteriorate and it becomes not always possible to efficiently achieve magneto-optical recording. Therefore, in order to put the magneto-optical recording medium into practice, it is necessary to prevent oxidation and corrosion of the magnetic material.

In order to solve the aforesaid problem, it has been proposed in an article "Prolongation of Service Life of Photomagnetic Disk by Addition Element" by Shinsuke Tanaka (KDD Research Institute) et al. in the synopsis of science lecture meeting No. 9 of the Magnetics Society of Japan, p. 209, to make a magneto-optical recording medium wherein an addition element such as Pt capable of preventing oxidation and corrosion of the magnetic material is approximately uniformly contained in the recording layer.

However, with the proposed magneto-optical recording medium, since the addition element is approximately uniformly mixed with the magnetic material, the addition element and the magnetic material are intimately related to each other, and there is the risk of magnetic characteristics being deteriorated by the presence of the addition element.

SUMMARY OF THE INVENTION

The primary object of the present invention is to provide a magneto-optical recording medium wherein magnetic characteristics are improved by preventing oxidation and corrosion of the magneto-optical recording layer.

Another object of the present invention is to provide a magneto-optical recording medium wherein resistance of the magneto-optical recording layer to oxidation and resistance thereof to corrosion are improved without deterioration of magnetic recording characteristics.

The present invention provides a magneto-optical recording medium comprising a transparent substrate, a magneto-optical recording layer formed on said transparent substrate and containing a rare earth metal-transition metal alloy, and a thin film containing at least either one of platinum and palladium and formed at least on one surface of said magneto-optical recording layer.

The present invention also provides a magneto-optical recording medium comprising a transparent substrate, and a magneto-optical recording layer formed on said transparent substrate by alternately overlaying a plurality of thin layers containing a rare earth metal-transition metal alloy, and a plurality of thin layers containing at least either one of platinum and palladium.

With the magneto-optical recording medium in accordance with the present invention, the thin film containing at least either one of platinum (Pt) and palladium (Pd) is formed on one surface or both surfaces of the magneto-optical recording layer, or the thin layers containing at least either one of platinum and palladium and thin layers containing a rare earth metal-transition metal alloy are alternately overlaid on the substrate, so that ambient oxygen, alkali salts or the like is caught by the thin film or the thin layers containing at least either one of platinum and palladium and prevented from entering the layer or layers for magneto-optical recording. Therefore, it is possible to prevent the magnetic material, i.e. the rare earth metal-transition metal alloy, contained in the layer or layers for magneto-optical recording from being oxidized or corroded by ambient oxygen, alkali salts or the like. As a result, it becomes possible to improve the magnetic characteristics of the magneto-optical recording layer.

Also, since the addition element such as Pt and Pd is contained in the thin film or in the thin layers independent of the layer or layers of the magnetic material without being mixed with the magnetic material, the addition element is separated from the magnetic material, and magnetic characteristics such as recording sensitivity are not caused to deteriorate by the addition element.

The rare earth metal-transition metal alloy contained in the layer or layers for magneto-optical recording may be GdFe, TbFe, DyFe, GdTbFe, TbDyFe, TbFeCo, GdFeCo, GdTbCo, GdTbFeCo, or the like.

In the first mentioned magneto-optical recording medium of the present invention, the thickness of the thin film containing at least either one of platinum and palladium is adjusted to such a value (e.g. 50 Å) that the effect of preventing oxidation and corrosion of the magneto-optical recording layer can be obtained. However, the thickness of the thin film formed on the recording/reproducing light incidence side of the magneto-optical recording layer should preferably be adjusted so that the thin film does not adversely affect transmittance with respect to recording light and reproducing light. Also, the thin film should preferably contain at least either one of platinum and palladium in an amount within the range of 2 to 70 atomic percent, and should preferably be formed as a passivity film, for example, a sparingly soluble oxide film.

In the second mentioned magneto-optical recording medium of the present invention, the thicknesses of the thin layers for magneto-optical recording are fixed by the thickness of the magneto-optical recording layer, the thicknesses of the thin layers containing at least either one of Pt and Pd, and the content ratio of Pt and/or Pd to the whole magneto-optical recording layer. The thickness of the magneto-optical recording layer should preferably be adjusted so that a C/N ratio sufficient for recording and reproducing can be obtained and recording and reproducing can be effected substantially with a light amount of an ordinarily used light source. Thus the thickness of the magneto-optical recording layer should preferably be adjusted to a value within the range of, for example, 100 Å to 5,000 Å, more preferably to a value of approximately 1,000 Å. The thicknesses of the thin layers containing at least either one of Pt and Pd should be adjusted so that the effect of preventing oxidation and corrosion of the rare earth metal-transition metal alloy can be obtained, and magnetic inter-action between the thin layers for magneto-optical recording is not adversely affected. Thus the thicknesses of the thin layers containing at least either one of Pt and Pd should preferably be adjusted to a value within the range of, for example, 2 Å per layer to 20 Å per layer, more preferably within the range of 5 Å per layer to 10 Å per layer. The content ratio of Pt and/or Pd to the whole magneto-optical recording layer should be adjusted to such a value that oxidation and corrosion of the rare earth metal-transition metal alloy can be prevented and the magnetic recording characteristics are not adversely affected. Thus, the content of Pt and/or Pd should be adjusted to a value within the range of, for example, 1 to 20 atomic percent with respect to the whole magneto-optical recording layer, preferably to a value of approximately 10 atomic percent with respect to the whole magneto-optical recording layer. Therefore, for example, the thicknesses of the thin layers for magneto-optical recording are adjusted to 90 Å when the thickness of the whole magneto-optical recording layer is 1,000 Å, the thicknesses of the thin layers containing at least either one of Pt and Pd are 10 Å, the content of Pt and/or Pd in said thin layers containing at least either one of Pt and Pd is 100%, and the content of Pt and/or Pd with respect to the whole magneto-optical recording layer is 10 atomic percent.

DESCRIPTION OF THE PREFERRED EMBODIMENTS

The present invention will hereinbelow be described in further detail with reference to the accompanying drawings.

Figure 1:
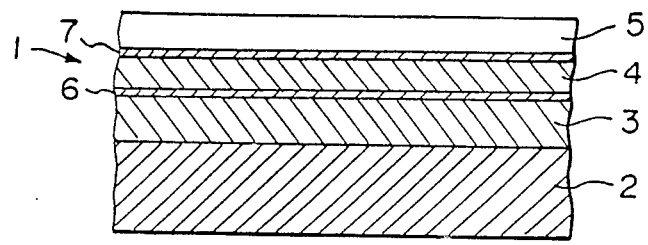
FIG. 1 is a sectional view showing the layer configuration of an embodiment of the magneto-optical recording medium in accordance with the present invention.

Referring to FIG. 1, a magneto-optical recording medium 1 comprises a transparent substrate 2, and a first protective layer 3, a magneto-optical recording layer 4, and a second protective layer 5 which are overlaid in this order on the transparent substrate 2. A first passivity film 6 and a second passivity film 7 are respectively formed on the upper and lower surfaces of the magneto-optical recording layer 4.

The transparent substrate 2 is constituted by glass, or a transparent plastic material such as PC, PMMA, or an epoxy resin, and formed to a thickness of approximately 1.2 mm.

The first protective layer 3 and the second protective layer 5 are constituted by a dielectric material such as SiO, $SiO_2$, $Si_3N_4$, AlN or ZnS, and formed to a thickness within the range of approximately 500 Å to approximately 3,000 Å. The protective layers 3 and 5 prevent the magneto-optical recording layer 4 from directly contacting ambient air, thereby to prevent oxidation of the magnetic material to some extent.

The magneto-optical recording layer 4 contains a rare earth metal-transition metal alloy, and is formed to a thickness of, for example, approximately 1,000 Å. The magneto-optical recording layer 4 may also contain Pt and/or Pd in a ratio of, for example, not higher than 20 atomic percent.

Each of the first passivity film 6 and the second passivity film 7 contains Pt and/or Pd in an amount within the range of 2 to 70 atomic percent with respect to the film, preferably within the range of 40 to 60 atomic percent, and is formed of a sparingly soluble oxide film, a sparingly soluble hydroxide film, or the like, containing Pt and/or Pd as the main constituent. The film contains Fe, Co, O, H, or the like as the other constituents, and may also contain Cr, Ti, Al, or the like as an element for accelerating the formation of the passivity film. The thickness of the second passivity film 7 should be adjusted so that the effect of preventing oxidation and corrosion of the magneto-optical recording layer 4 can be obtained, and should preferably be adjusted to a value within the range of 10 Å to 200 Å by taking into consideration that the increase in said effect is saturated at a certain thickness when the film thickness is increased. On the other hand, since the first passivity film 6 is formed on the recording/reproducing light incidence side of the magneto-optical recording layer 4, the thickness of the first passivity film 6 should be adjusted so that it does not adversely affect the transmittance to the recording light and the reproducing light. Thus the thickness of the first passivity film 6 should be adjusted to, for example, not larger than 50 Å.

The first passivity film 6 and the second passivity film 7 are formed by carrying out predetermined oxidation processing on the upper surfaces of the first protective layer 3 and the magneto-optical recording layer 4. Oxidation processing is achieved by carrying out reactive sputtering of Pt and/or Pd in an atmosphere containing Ar and $O_2$, or in an atmosphere containing Ar and $H_2O$. Or, after a thin film of Pt and/or Pd is formed, oxidation processing may be effected by treating the thin film with heat (for example, treating it at a temperature within the range of 50° C. to 100° C. for a period not longer than 60 minutes) in ambient air. Instead of sputtering, vacuum evaporation may be carried out. The passivity films 6 and 7 may also be formed by natural oxidation without carrying out the aforesaid oxidation processing.

Though the passivity film is formed on both surfaces of the magneto-optical recording layer 4 in the embodiment of FIG. 1, it may be formed on only one surface of the magneto-optical recording layer 4.

Also, though the passivity film is used as the thin film for preventing oxidation and corrosion of the magnetic material in the magneto-optical recording layer in the embodiment of FIG. 1, the thin film need not necessarily be in the passivity.

Figure 2:
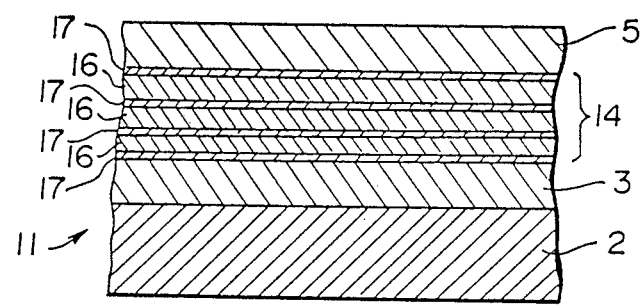
FIG. 2 is a sectional view showing the layer configuration of another embodiment of the magneto-optical recording medium in accordance with the present invention.

FIG. 2 shows the layer configuration of another embodiment of the magneto-optical recording medium in accordance with the present invention. In FIG. 2, similar elements are numbered with the same reference numerals used with respect to FIG. 1. In this embodiment, a magneto-optical recording medium 11 comprises the transparent substrate 2, and the first protective layer 3, a magneto-optical recording layer 14, and the second protective layer 5, which are overlaid in this order on the transparent substrate 2. The magneto-optical recording layer 14 is formed by alternately overlaying a plurality of magnetic layers 16, 16, ... and a plurality of non-magnetic layers 17, 17, ....

The magneto-optical recording layer 14 are formed to a thickness of approximately 1,000 Å by alternately overlaying approximately ten magnetic layers 16, 16, ... and approximately ten non-magnetic layers 17, 17, ....

The magnetic layers 16, 16, ... contain a rare earth metal-transition metal alloy, and are formed to a thickness of, for example, approximately 100 Å. The magnetic layers 16, 16, ... may also contain Pt and/or Pd in a ratio of, for example, not higher than 20 atomic percent.

The non-magnetic layers 17, 17, ... mainly contain Pt and/or Pd and are formed to a thickness within the range of approximately 5 Å to 10 Å. The non-magnetic layers 17, 17, ... may be formed as passivity layers such as sparingly soluble hydroxide films mainly containing Pt and/or Pd.

The magneto-optical recording layer 14 is formed by carrying out simultaneous sputtering on the transparent substrate 2 by use of a target composed of Pt and/or Pd and a target composed of a rare earth metal-transition metal alloy. In the course of simultaneous sputtering, it is necessary to adjust the positions of the two targets so that the phases of layer formation by sputtering from the targets are deviated by a half period by rotation of the transparent substrate and the magneto-optical recording layer 14 as shown in FIG. 2 is formed. The content of Pt and/or Pd in the magneto-optical recording layer 14 may be adjusted by changing the ratio of electric power applied to one of the targets to the electric power applied to the other thereof. The thicknesses of the respective layers may be adjusted by changing the electric power applied to the targets and the rotation speed of the transparent substrate 2.

With the embodiment of FIG. 2, since the magnetic layers 16, 16, ... are formed to be thin and the non-magnetic layers 17, 17, ... are formed among the magnetic layers 16, 16, ... , the coercive force of the magnetic material in the magnetic layers 16, 16, ... becomes large, and it becomes possible to improve stability of the recording bits. The thicknesses of the magnetic layers 16, 16, ... are not limited to the aforesaid value. However, the coercive force of the magnetic material decreases as the thicknesses of the magnetic layers 16, 16, ... are increased.

In the embodiment of FIG. 2, the thicknesses of the respective layers of the magneto-optical recording medium are not limited to the aforesaid values Also, the method of forming the magneto-optical recording layer is not limited to the aforesaid one, and any other method may be used. For example, the rare earth metal-transition metal alloy and Pt and/or Pd may be sputtered alternately, or a deposition process may be used instead of the sputtering process.

With the aforesaid embodiments, it is possible to prevent generation of pinholes and cracks in the magneto-optical recording layer, and to improve the bit error rate. For example, with the conventional magneto-optical recording medium, the bit error rate of the magneto-optical recording medium is deteriorated by approximately two orders of ten when approximately 100 hours have elapsed. However, with the embodiment of FIG. 1 (in the case where the content of Pt and/or Pd in the magneto-optical recording layer is approximately 50% by weight) and with the embodiment of FIG. 2, the period taken for the bit error rate to be deteriorated to the same extent can be prolonged by at least several times the period obtained with the conventional magneto-optical recording medium.

We claim:

1. A magneto-optical recording medium comprising a transparent substrate, a magneto-optical recording layer formed on said transparent substrate and containing a rare earth metal-transition metal alloy, and a thin film containing at least either one of platinum and palladium and formed at least on one surface of said magneto-optical recording layer.

2. A magneto-optical recording medium as defined in claim 1 wherein said thin film is a passivity film.

3. A magneto-optical recording medium as defined in claim 1 wherein said thin film contains at least either one of platinum and palladium in an amount within the range of 2 to 70 atomic percent.

4. A magneto-optical recording medium as defined in claim 1 wherein said thin film contains at least either one of platinum and palladium in an amount within the range of 40 to 60 atomic percent.

5. A magneto-optical recording medium as defined in claim 1 wherein said thin film is formed on the surface of said magneto-optical recording layer farther from said transparent substrate, and has a thickness within the range of 10 Å to 200 Å.

* * * * *